US012676772B2

(12) United States Patent
Wu et al.

(10) Patent No.: US 12,676,772 B2
(45) Date of Patent: Jul. 7, 2026

(54) ZERO-TRUST NETWORK ACCESS WITH USER DATAGRAM PROTOCOL MESSAGE FORWARDING

(71) Applicant: Fortinet, Inc., Sunnyvale, CA (US)

(72) Inventors: Weining Wu, Burnaby (CA); Junhao Yin, Burnaby (CA)

(73) Assignee: FORTINET, INC., Sunnyvale, CA (US)

( * ) Notice: Subject to any disclaimer, the term of this patent is extended or adjusted under 35 U.S.C. 154(b) by 0 days.

(21) Appl. No.: 18/651,086

(22) Filed: Apr. 30, 2024

(65) Prior Publication Data

US 2025/0337614 A1     Oct. 30, 2025

(51) Int. Cl.
H04L 12/46     (2006.01)
H04L 47/19     (2022.01)

(52) U.S. Cl.
CPC .......... H04L 12/4633 (2013.01); H04L 47/19 (2013.01)

(58) Field of Classification Search
None
See application file for complete search history.

(56) References Cited

U.S. PATENT DOCUMENTS

| | | | |
|---|---|---|---|
| 2016/0261559 A1* | 9/2016 | Herrero | H04L 69/16 |
| 2016/0269285 A1* | 9/2016 | Herrero | H04L 45/74 |
| 2017/0078359 A1* | 3/2017 | Herrero | H04N 21/4788 |
| 2020/0280516 A1* | 9/2020 | Gross, IV | H04L 12/4633 |

| | | | |
|---|---|---|---|
| 2021/0226884 A1* | 7/2021 | Jaffer | H04L 47/34 |
| 2021/0352047 A1* | 11/2021 | Singh | H04L 61/2592 |
| 2022/0116319 A1* | 4/2022 | Dutta | H04L 69/18 |
| 2022/0191139 A1* | 6/2022 | Dutta | H04L 69/22 |
| 2022/0224621 A1* | 7/2022 | Devarajan | H04L 43/103 |
| 2022/0224703 A1* | 7/2022 | Devarajan | H04L 45/20 |
| 2022/0311695 A1* | 9/2022 | Kaciulis | H04L 63/0272 |
| 2022/0360644 A1* | 11/2022 | Ihlar | H04L 12/4633 |
| 2022/0407799 A1* | 12/2022 | Amend | H04L 12/4633 |
| 2023/0283537 A1* | 9/2023 | Balaiah | H04L 47/12 370/254 |
| 2023/0367833 A1* | 11/2023 | Kol | G06F 16/958 |
| 2024/0114014 A1* | 4/2024 | Pinheiro | H04L 47/122 |
| 2024/0214470 A1* | 6/2024 | Shribman | G06Q 50/16 |
| 2024/0356832 A1* | 10/2024 | Manolescu | H04L 45/76 |

(Continued)

FOREIGN PATENT DOCUMENTS

WO      WO-2021009553 A1 *   1/2021   ............. H04L 47/10

*Primary Examiner* — Phyllis A Book

(74) *Attorney, Agent, or Firm* — Jaffery Watson Hamilton & DeSanctis LLP

(57)     ABSTRACT

Zero-trust network access (ZTNA) with user datagram protocol (UDP) message forwarding is disclosed. A forwarding rule is determined based on a destination address associated with a received data traffic packet formatted according to a first protocol (e.g., UDP). A bi-directional tunnel is created to forward the traffic based on the determined forwarding rule. A request is generated over a stream having a corresponding stream identifier within the bi-directional tunnel to establish a connection with a proxy device. The traffic packet payload formatted according to the first protocol is wrapped with at least the stream identifier. The wrapped data traffic packet is forwarded to a client device based on the determined forwarding rule to a destination device corresponding to the stream identifier.

20 Claims, 6 Drawing Sheets

(56) References Cited

U.S. PATENT DOCUMENTS

2024/0430347 A1 * 12/2024 Ihlar ................... H04L 12/1407
2025/0119471 A1 *  4/2025 Parla ...................... H04L 45/24
2025/0212268 A1 *  6/2025 Mihály ................ H04L 67/141

* cited by examiner

ZERO-TRUST NETWORK ACCESS WITH USER DATAGRAM PROTOCOL MESSAGE FORWARDING

BACKGROUND

Various embodiments of the present disclosure generally relate to zero-trust network access (ZTNA). In particular, some embodiments relate to User Datagram Protocol (UDP) message forwarding when making use of ZTNA devices. Current ZTNA devices only support Transmission Control Protocol (TCP)-based services. This limits the kinds of services that can be accessed through ZTNA devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
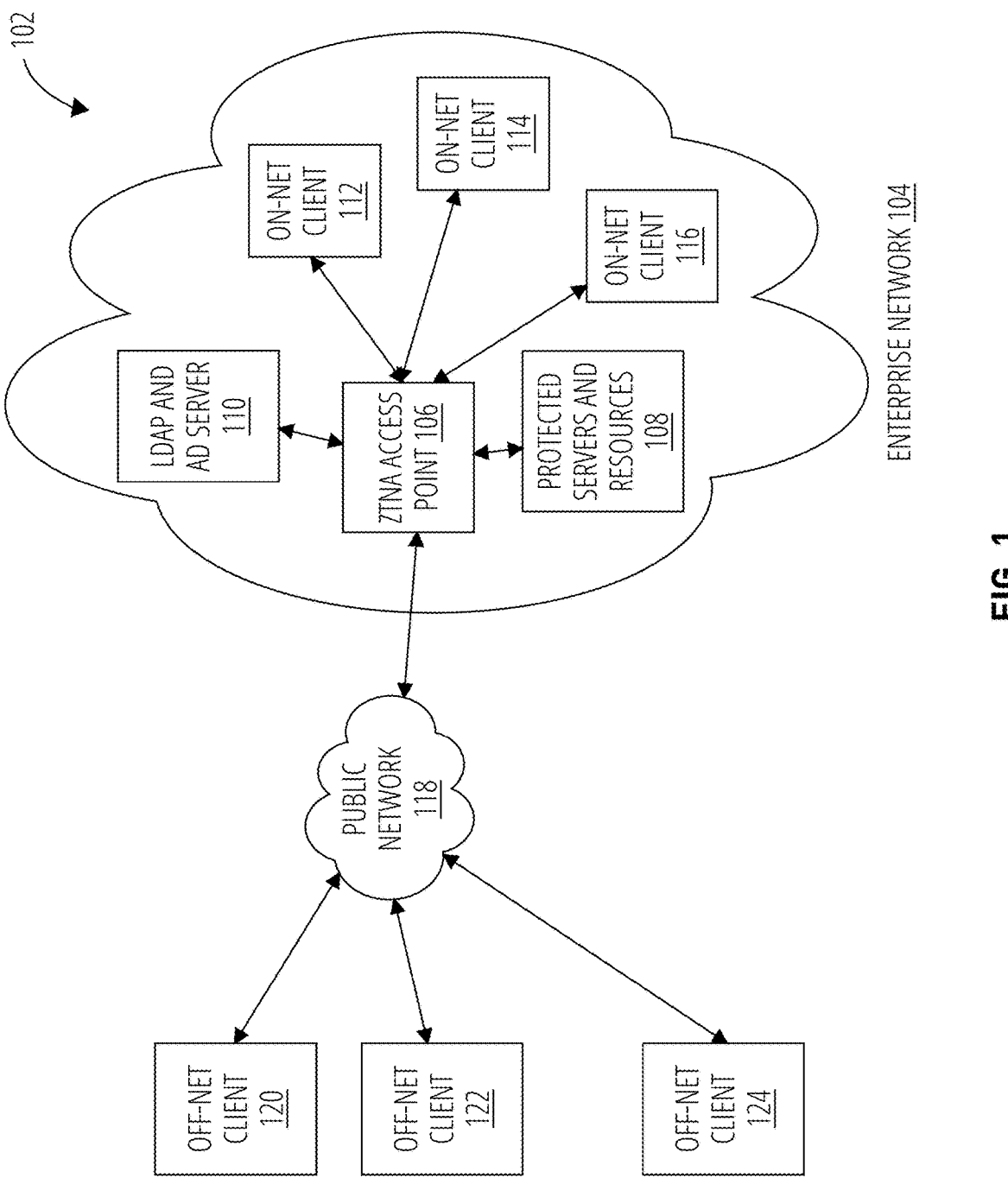
FIG. 1 is a block diagram illustrating an operating environment in which various embodiments of the present disclosure may be employed.

In the following description, numerous specific details are outlined to provide a thorough understanding of the embodiments of the present disclosure. It will be apparent, however, to one skilled in the art that embodiments of the present disclosure may be practiced without some of these specific details. In other instances, well-known structures and devices are shown in block diagram form.

Brief definitions of terms used throughout this application are given below.

An "image" refers to a file that contains the code for a specific device or system. Thus, a "firmware image" is a file that contains the firmware code for a specific device or system. The image file can include the necessary code for a device along with configuration settings, data structures, and/or other information required for the device to function properly. Firmware images differ from traditional application code because they contain all the necessary systems software to make hardware work (and may or may not include an operating system to achieve this result). Firmware images are commonly used in device such as computer systems, laptop computers, tablets, routers, printers, camera and other electronic devices. Firmware images are also used in other applications, such as industrial control systems, smart home devices, aviation, automotive applications, medical systems, military technologies, etc.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution.

Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTI- WEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. In some cases, a ZTNA AP runs one or more access proxies, including a TFAP. Depending on the particular implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled" and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

FIG. 1 is a block diagram illustrating operating environment 102 in which various embodiments of the present disclosure may be employed. In the context of the present example, multiple off-net clients (e.g., off-net client 120, off-net client 122, off-net client 124) access enterprise network 104 via public network 118 (e.g., the Internet). The off-net clients may represent endpoint or client devices (e.g., workstations, desktop computers, laptop computers, or mobile devices) used by remote workers associated with a particular organization or enterprise.

One or more components illustrated in FIG. 1 can utilize Zero-Trust Network Access (ZTNA) technologies and functionalities that enable secure access to internal applications for local or remote users (e.g., utilizing on-net endpoint or client devices within an enterprise network or off-net endpoint or client devices outside of the enterprise network, respectively). ZTNA may be used to authenticate and authorize access to resources based on identity, device, and/or contextual data. ZTNA solutions typically grant access on a per-session basis to individual applications only after devices and users are verified. Further, the described ZTNA technologies and functionalities can provide UDP message forwarding.

In an example, enterprise network 104 includes Lightweight Directory Access Protocol (LDAP) and Active Directory (AD) (LDAP and AD) server 110, ZTNA access point 106, protected servers and resources 108, and multiple on-net clients (e.g., on-net client 112, on-net client 114, on-net client 116). In an example, the on-net clients are locally attached client devices used by onsite workers. In an example, ZTNA access point 106 is a network security appliance operable within enterprise network 104. ZTNA access point 106 may be responsible for controlling access to protected servers and resources 108, which may include various protected network devices, servers, resources, services, TCP applications, and/or databases. For example, as is known in the art, ZTNA access point 106 may evaluate policies to determine what devices and users can access a given target service of protected servers and resources 108.

In an example, when a given user session matches a policy, ZTNA access point 106 may set up a proxy tunnel session (e.g., a TFAP tunnel) between an endpoint security agent (not shown), running on a requesting endpoint device (e.g., one of the off-net clients or one of the on-net clients) and acting as a proxy on behalf of a client application (e.g., a browser), and the target service. In some cases, the evaluation of the policies may include consulting LDAP and AD server 110 regarding a user's AD group and/or domain. For example, access to one or more of protected servers and resources 108 may be limited to a requesting endpoint that belongs to AD. In some examples, access to certain Virtual Local Area Networks (VLANs) may be based on the logged in user's AD group membership. Deny policies can be used with endpoints when they fall outside of security posture policies; for example, access may be denied to certain resources or network segments if an endpoint is tagged with critical vulnerabilities.

As described in greater detail below, the architectures described provide support for UDP message forwarding to a ZTNA destination. In an example, UDP forwarding works similarly to TCP forwarding (e.g., with a single configuration setting needed to identify the ZTNA destination as a UDP service). In an example, once a user configures a ZTNA destination as a UDP forwarding ZTNA destination, the UDP traffic to and from the service is transparently tunneled through ZTNA devices without a need for explicit user interaction. In an example, QUIC is used as the underlying protocol, which allows UDP traffic forwarding with reduced overhead as compared to TCP forwarding techniques.

QUIC is a UDP-based multiplexed and secure transport protocol standardized by the Internet Engineering Task Force (IETF) Request for Comments (RFC) 9000, published in May 2021. QUIC is a general-purpose transport layer network protocol that establishes multiplexed connections between two endpoints using UDP. The multiplexed connections allow multiple streams of data to reach endpoints independently.

Figure 2:
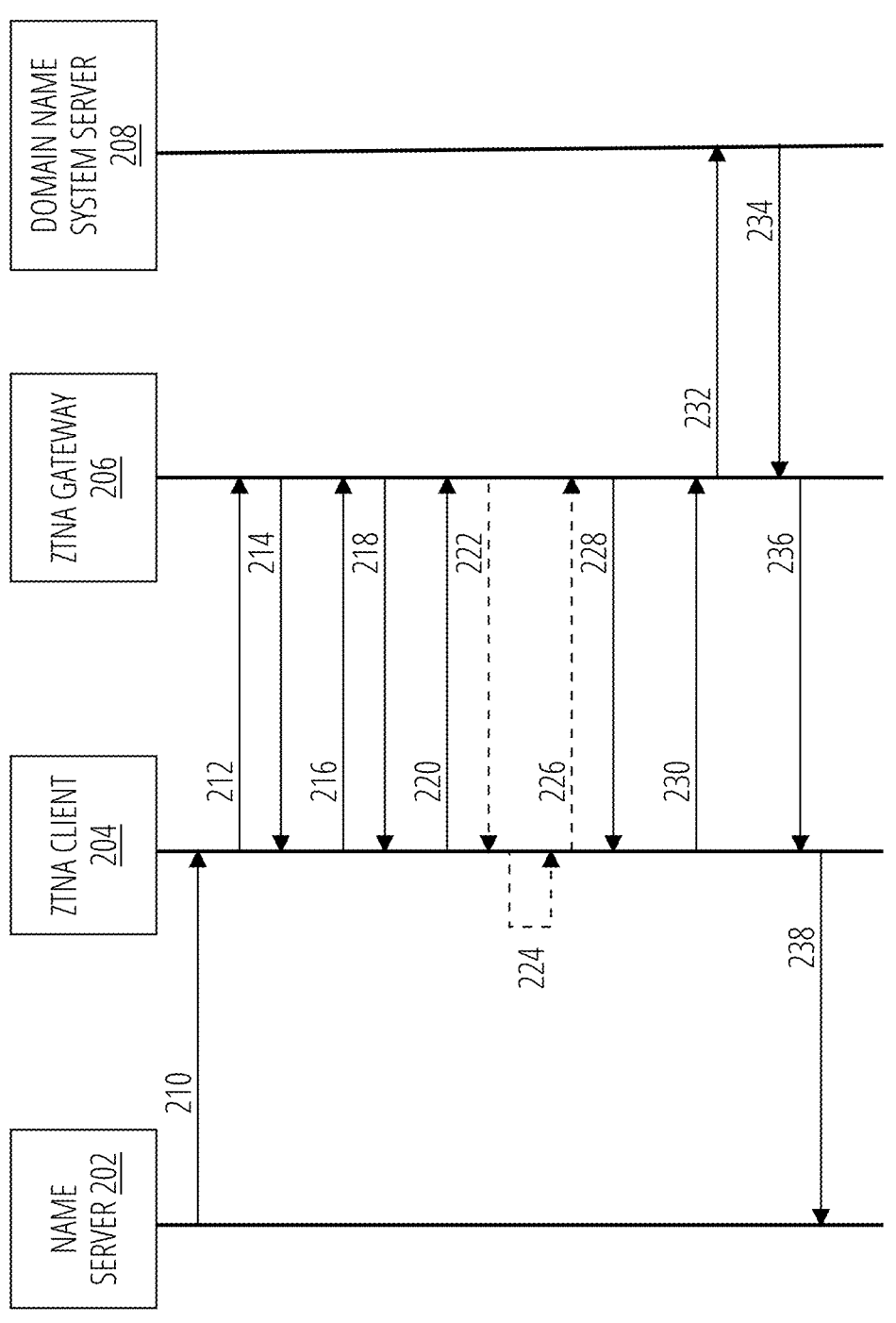
FIG. 2 is a transaction diagram for an example approach to providing UDP forwarding in a ZTNA environment.

FIG. 2 is a transaction diagram for an example approach to providing UDP forwarding in a ZTNA environment. The operations described with respect to FIG. 2 can be performed by, for example, the architecture of FIG. 1. In an example, UDP forwarding is supported by name server 202, ZTNA client 204, ZTNA gateway 206 and domain name system server 208.

In an example, a client device can start a local UDP server to listen to local UDP connections. In an example, the client device can run an endpoint security agent. A non-limiting example of an endpoint security agent is the FORTICLIENT Fabric Agent available from Fortinet, Inc. of Sunnyvale, CA. Other endpoint security agents can provide the functionality described. In an example, based on the currently configured ZTNA destinations, filter rules are added to the system to redirect UDP traffic to the local UDP server. Once UDP name server 202 receives this traffic, the UDP name server 202 determines the corresponding ZTNA rule from its original destination address and sends the UDP packet to ZTNA client 204 (as illustrated by transaction 210). In an example, ZTNA rules have information that includes the intended ZTNA destination, the ZTNA access proxy gateway, and the protocol (UDP/TCP).

In an example, once an appropriate rule is found, a QUIC connection is made if not already established from a previous tunnel (as illustrated by transaction 212) with ZTNA client 204. Once a QUIC connection has been established (as illustrated by transaction 214), a QUIC bidirectional stream is opened on the connection (as illustrated by transactions 216 and 218), and an HTTP/3 GET request (or similar) is made on this QUIC stream to establish a ZTNA tunnel with the access proxy (as illustrated by transaction 220). In an example, the GET request contains information about the ZTNA destination address (host and port) used to identify the ZTNA tunnel.

In an example, ZTNA gateway 206 requests user authentication from ZTNA client 204 (as illustrated by transaction 222), which causes ZTNA client 204 to prompt a user for authentication (as illustrated by transaction 224). The GET request is then resent with user credentials by ZTNA client 204 to ZTNA gateway 206 (as illustrated by transaction 226).

In a QUIC example, if a tunnel is established correctly in response to the authentication, the access proxy (e.g., ZTNA gateway 206) returns an HTTP status code of 101 (as illustrated by transaction 228), switching protocols to the client (e.g., ZTNA client 204). In an example, in response to receiving the 101 code, ZTNA client 204 forwards UDP traffic coming from local client applications through the QUIC connection using, for example, the Unreliable Datagram extension to QUIC (IETF RFC-9221).

In an example, because this traffic does not pass through the standard QUIC stream, in order for the traffic to be associated with an intended ZTNA destination, the QUIC stream ID corresponding with the QUIC stream that was used to establish the tunnel for this traffic is appended to the front of the datagram (as illustrated by transaction 230). In an example, the QUIC stream ID is shifted 2 bits to the right (divided by 4), as those 2 bits indicate the stream is opened by the client and is bidirectional, which would always be the case in the example use-case:

[(Stream-ID/4) encoded as QUIC varint][original datagram payload]

Thus, the original UDP datagram payload is wrapped in a QUIC datagram frame with stream ID 0 appended at the front of the payload, and the wrapped UDP datagram payload is sent through the QUIC connection. Similarly, when there is traffic coming from the access proxy, it is encoded in a similar way, such that the Stream-ID can be used to associate the traffic back to a tunnel and forward the traffic to the correct local UDP application.

In an example, ZTNA gateway 206 extracts the UDP datagram payload from the QUIC datagram frame and forwards the extracted UDP datagram payload to a remote destination corresponding to the stream ID using domain name system server 208 (as illustrated by transaction 232). In an example, ZTNA gateway 206 receives a remote UDP datagram using domain name system server 208 (as illustrated by transaction 234). In an example, ZTNA gateway 206 wraps and transmits the received UDP datagram payload using the techniques described above (as illustrated by transaction 236). In an example, ZTNA client 204 extracts the UDP datagram payload from the QUIC datagram frame and forwards the UDP datagram payload back to the originating app (as illustrated by transaction 238).

In an example, an established tunnel is closed when the UDP socket created on the client application used to send traffic (which is redirected to our local UDP server) to forward is closed. Once the app's socket is detected to be closed and after some timeout, the tunnel itself is closed.

Figure 3:
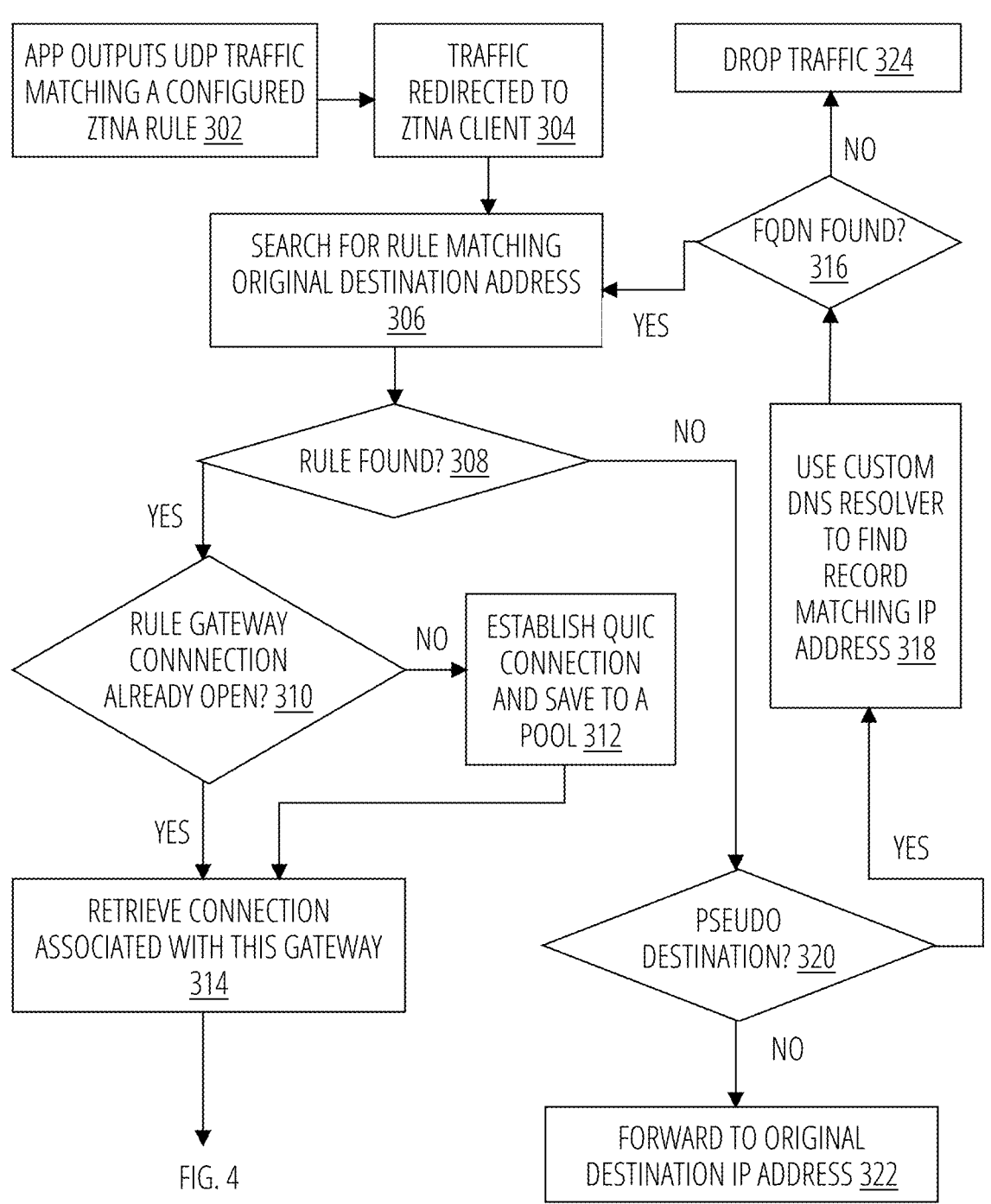
FIG. 3 is a flow diagram of a first portion of a technique for providing UDP forwarding in a ZTNA environment.

FIG. 3 is a flow diagram of a first portion of a technique for providing UDP forwarding in a ZTNA environment. In an example, the functionality described with respect to FIG. 3 can be performed by, for example, the architecture of FIG. 1.

In an example, as an initial operation, an app outputs UDP traffic matching a configured ZTNA rule, 302. The UDP traffic is redirected to the appropriate ZTNA client, 304. In an example, the ZTNA client can run an endpoint security agent. A non-limiting example of an endpoint security agent is the FORTICLIENT Fabric Agent available from Fortinet, Inc. of Sunnyvale, CA. Other endpoint security agents can provide the functionality described.

In an example, the ZTNA client searches for a rule matching the original destination address, 306. If the rule is found, 308, and the corresponding rule gateway connection is already open, 310, the connection associated with the gateway is retrieved, 314. If the rule is found, 308, and the rule gateway connection is not already open, 310, a QUIC connection is established and saved to a pool, 312. The connection associated with the gateway can then be retrieved, 314.

In an example, if the rule is not found, 308, and the destination is not a pseudo destination, 320, the UDP traffic is forwarded to the original destination address (e.g., IP address), 322. If the rule is not found, 308, and the destination is a pseudo destination, 320, a custom DNS resolver is used to find a record matching the destination address, 318. If a fully qualified domain name (FQDN) is found, 316, the ZTNA client searches for a rule matching the original destination address, 306. If a FQDN is not found, 316, the traffic is dropped, 324.

Figure 4:
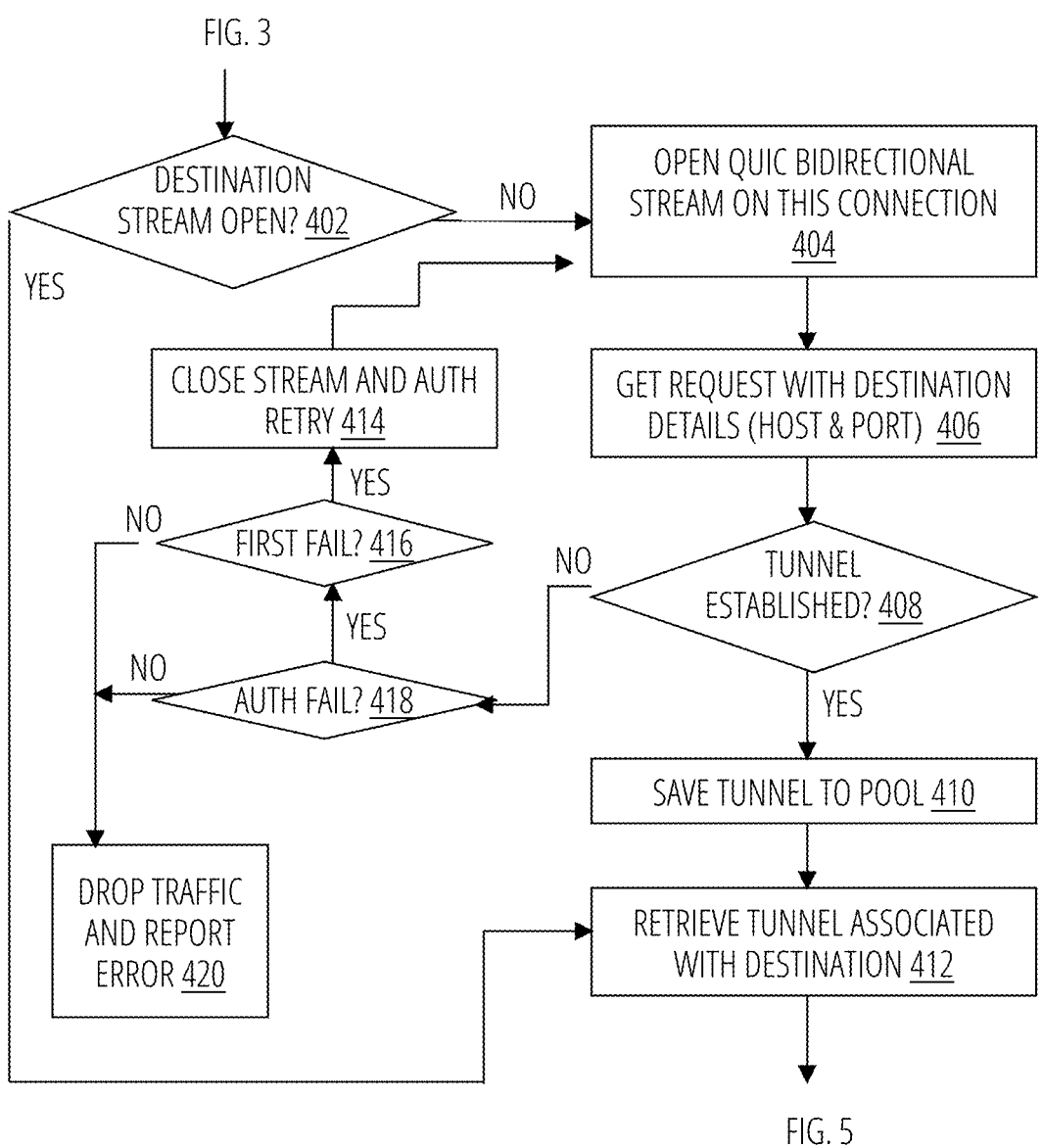
FIG. 4 is a flow diagram of a second portion of a technique for providing UDP forwarding in a ZTNA environment.

FIG. 4 is a flow diagram of a second portion of a technique for providing UDP forwarding in a ZTNA environment. In an example, the functionality described with respect to FIG. 4 can be performed by, for example, the architecture of FIG. 1.

In an example, in response to retrieving the connection associated with the gateway (314 in FIG. 3), the system can determine whether the destination stream is already open, 402, and, if so, the tunnel associated with the destination is retrieved, 412. In an example, if the destination stream is not already open, 402, a QUIC bi-directional stream is opened on the connection, 404. In an example, an HTTP/3 GET request (or similar) is made on this QUIC stream to establish a ZTNA tunnel with the access proxy, 406. In an example, the GET request contains information about the ZTNA destination address (host and port) used to identify the ZTNA tunnel.

If the tunnel is successfully established, 408, the tunnel is saved to a tunnel pool, 410, and the tunnel associated with the destination is retrieved, 412. If the tunnel is not successfully established, 408, if the authorization did not fail, 418, the traffic is dropped and an error is reported, 420. In an example, if the tunnel is not successfully established, 408, and the authorization failed, 418, if it is not the first authorization fail, 416, the traffic is dropped and an error is reported, 420. In an example, if the tunnel is not successfully established, 408, and the authorization failed, 418, if it is the first authorization fail, 416, the stream is closed and authentication is retried, 414.

Figure 5:
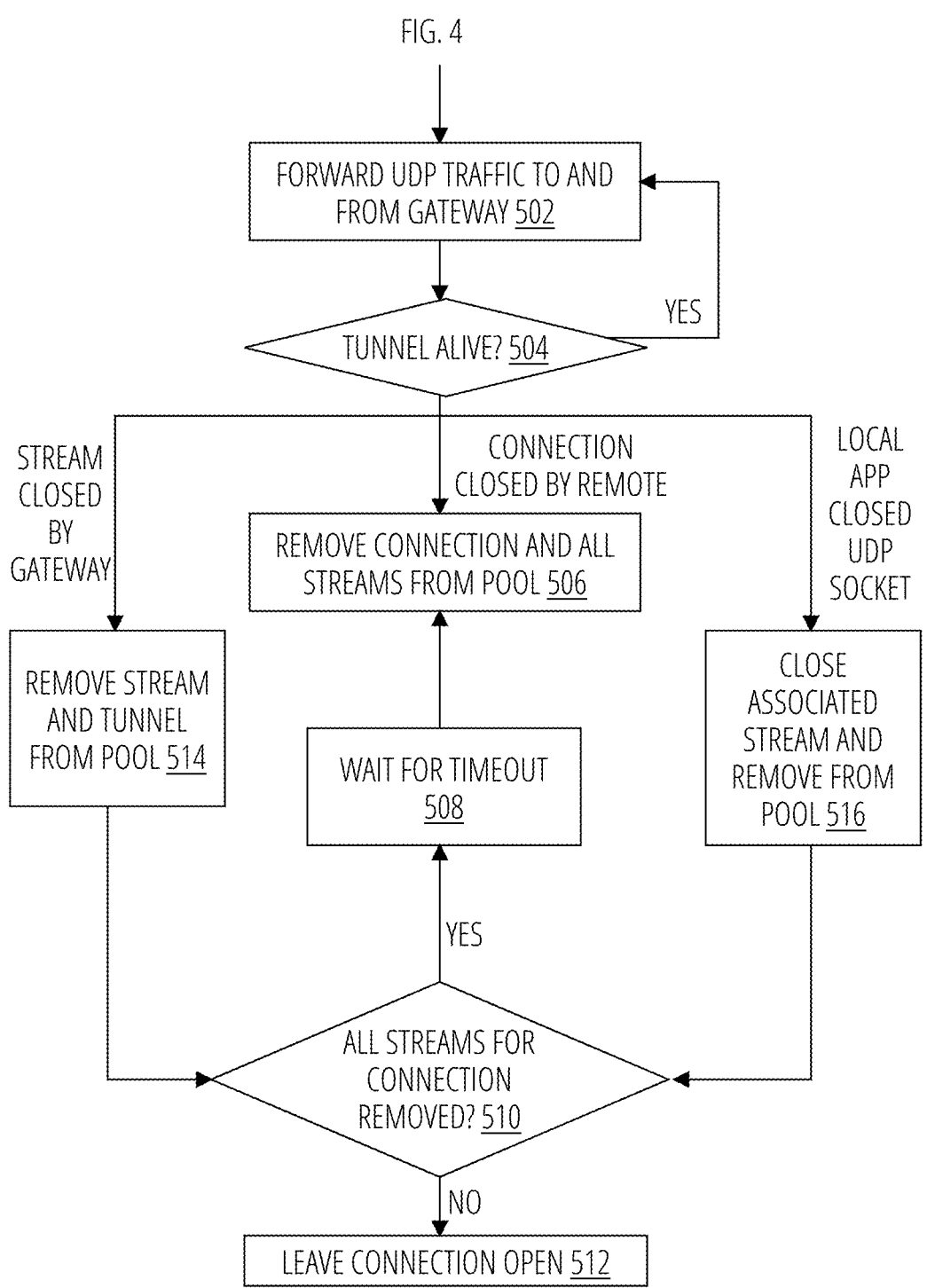
FIG. 5 is a flow diagram of a third portion of a technique for providing UDP forwarding in a ZTNA environment.

FIG. 5 is a flow diagram of a third portion of a technique for providing UDP forwarding in a ZTNA environment. In an example, the functionality described with respect to FIG. 5 can be performed by, for example, the architecture of FIG. 1.

In an example, in response to retrieving the tunnel associated with the destination (412 in FIG. 4), the UDP traffic is forwarded to and from the gateway, 502. In an example, as long as the tunnel is alive, 504, the traffic is forwarded to and from the gateway 502. In an example, if the tunnel is not alive, 504, because the stream has been closed by the gateway, the stream and the tunnel are removed from the pool, 514. In an example, if the tunnel is not alive, 504, because the local app closed the UDP socket, the stream is closed and removed from the pool, 516. In an example, if the tunnel is not alive, 504, because the connection was closed remotely, the connection and all streams are removed from the pool, 506.

In an example, if all streams for a connection have not been removed, 512, the connection is left open. If all streams for a connection have been removed, 512, the system can wait for a timeout, 508, and remove the connection and all streams from the pool, 506.

Figure 6:
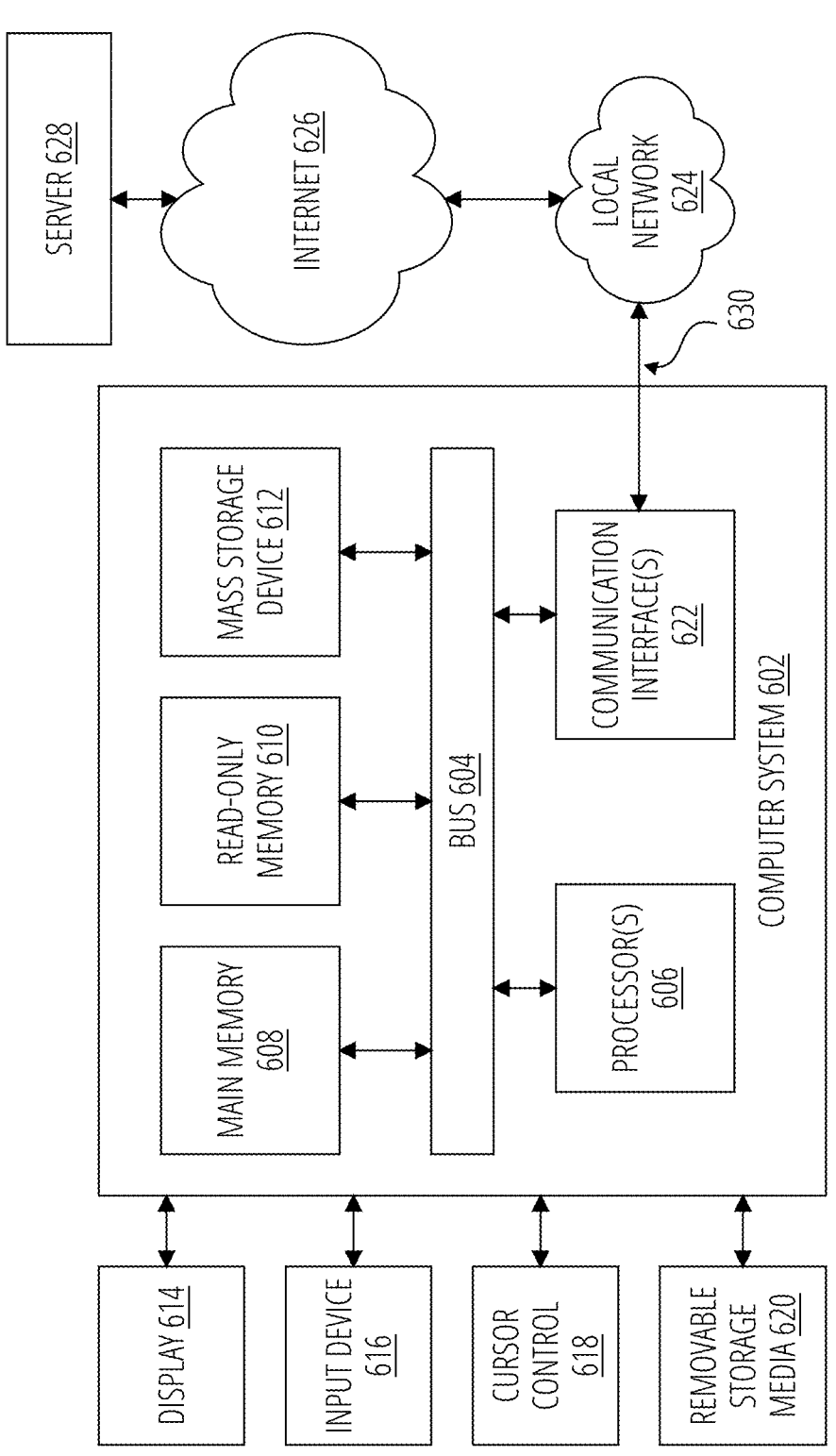
FIG. 6 is a block diagram that illustrates a computer system in which or with which an embodiment of the present disclosure may be implemented.

FIG. 6 is a block diagram that illustrates a computer system in which or with which an embodiment of the present disclosure may be implemented. Computer system 602 may be representative of an endpoint or client device (e.g., one of the off-net clients or on-net clients) on which an endpoint security agent is running and acting as a proxy on behalf of a client application (e.g., a browser).

Notably, components of computer system 602 described herein are meant only to exemplify various possibilities. In no way should example computer system 602 limit the scope of the present disclosure. In the context of the present example, computer system 602 includes bus 604 or other communication mechanism for communicating information and one or more processing resources (e.g., one or more hardware processor(s) 606) coupled with bus 604 for processing information. Hardware processor(s) 606 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 602 also includes main memory 608, such as a random-access memory (RAM) or other dynamic storage device, coupled to bus 604 for storing information and instructions to be executed by processor(s) 606. Main memory 608 also may be used for storing temporary variables or other intermediate information during execution of instructions to be executed by processor(s) 606. Such instructions, when stored in non-transitory storage media accessible to processor(s) 606, render computer system 602 into a special-purpose machine customized to perform the operations specified in the instructions.

Computer system 602 includes a read-only memory 610 or other static storage device coupled to bus 604 for storing static information and instructions for processor(s) 606. Mass storage device 612 (e.g., a magnetic disk, optical disk or flash disk (made of flash memory chips), is provided and coupled to bus 604 for storing information and instructions.

Computer system 602 may be coupled via bus 604 to display 614 (e.g., a cathode ray tube (CRT), Liquid Crystal Display (LCD), Organic Light-Emitting Diode Display (OLED), Digital Light Processing Display (DLP) or the like, for displaying information to a computer user. Input device 616, including alphanumeric and other keys, is coupled to bus 604 for communicating information and command selections to processor(s) 606. Another type of user input device is cursor control 618, such as a mouse, a trackball, a trackpad, or cursor direction keys for communicating direction information and command selections to processor(s) 606 and for controlling cursor movement on display 614. This input device typically has two degrees of freedom in two axes, a first axis (e.g., x) and a second axis (e.g., y), that allows the device to specify positions in a plane.

Removable storage media 620 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 602 may implement the techniques described herein using customized hard-wired logic, one or more ASICs or FPGAs, firmware or program logic which in combination with the computer system causes or programs computer system 602 to be a special-purpose machine. According to one embodiment, the techniques herein are performed by computer system 602 in response to processor(s) 606 executing one or more sequences of one or more instructions contained in main memory 608. Such instructions may be read into main memory 608 from another storage medium, such as mass storage device 612. Execution of the sequences of instructions contained in main memory 608 causes processor(s) 606 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 612. Volatile media includes dynamic memory, such as main memory 608. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wires, and fiber optics, including the wires that comprise bus 604. Transmission media can also be acoustic or light waves, such as those generated during radio-wave and infrared data communications.

Various forms of media may be involved in carrying one or more sequences of one or more instructions to processor(s) 606 for execution. For example, the instructions may initially be carried on a magnetic disk or solid-state drive of a remote computer. The remote computer can load the instructions into its dynamic memory and send the instructions over a telephone line using a modem. A modem local to computer system 602 can receive the data on the telephone line and use an infra-red transmitter to convert the data to an infra-red signal. An infra-red detector can receive the data from the infra-red signal, and appropriate circuitry can place the data on bus 604. Bus 604 carries the data to main memory 608, from which processor(s) 606 retrieve and execute the instructions. The instructions received by main memory 608 may optionally be stored on mass storage device 612 either before or after execution by processor(s) 606.

Computer system 602 also includes communication interface(s) 622 coupled to bus 604. Communication interface(s) 622 provides a two-way data communication coupling to network link 630 that is connected to local network 624. For example, communication interface(s) 622 may be an integrated services digital network (ISDN) card, cable modem, satellite modem, or a modem to provide a data communication connection to a corresponding type of telephone line. Another example is communication interface(s) 622, which may be a local area network (LAN) card that provides a data communication connection to a compatible LAN. Wireless links may also be implemented. In any such implementation, communication interface(s) 622 sends and receives electrical, electromagnetic or optical signals that carry digital data streams representing various types of information.

Network link 630 typically provides data communication through one or more networks to other data devices. Local network 624 and internet 626 both use electrical, electromagnetic or optical signals that carry digital data streams. The signals through the various networks and network link 630 and through communication interface(s) 622, which carry the digital data to and from computer system 602, are example forms of transmission media.

Computer system 602 can send messages and receive data, including program code, through the network(s), network link 630 and communication interface(s) 622. In the Internet example, server 628 might transmit a requested code for an application program through internet 626, local network 624 and communication interface(s) 622. The received code may be executed by processor(s) 606 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to "one example" or "an example" means that a particular feature, structure, or characteristic described in connection with the example is included in at least one embodiment of the disclosure. The appearances of the phrase "in one example" in various places in the specification do not necessarily refer to the same embodiment.

It is contemplated that any number and type of components may be added to and/or removed to facilitate various embodiments, including adding, removing, and/or enhancing certain features. For brevity, clarity, and ease of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component," "module," "system," and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A method comprising:
   determining a forwarding rule based on a destination address associated with a received data traffic packet formatted according to a first protocol, wherein the forwarding rule comprises a zero-trust network access (ZTNA)-compliant traffic forwarding rule and the first protocol comprises a User Datagram Protocol (UDP)-compliant protocol;

creating a bi-directional tunnel to forward the traffic based on the determined forwarding rule;

generating a request over a stream having a corresponding stream identifier within the bi-directional tunnel to establish a connection with a proxy device;

wrapping a payload of the traffic packet formatted according to the first protocol with at least the stream identifier;

forwarding the wrapped payload of the traffic packet to a client device based on the determined forwarding rule to a destination device corresponding to the stream identifier.

2. The method of claim 1, wherein the corresponding stream identifier comprises QUIC stream ID corresponding with the QUIC stream that was used to establish the tunnel.

3. The method of claim 2, wherein wrapping the payload of the traffic packet formatted according to the first protocol with at least the stream identifier comprises appending the QUIC stream ID to the UDP datagram payload being forwarded.

4. The method of claim 2, wherein forwarding the data traffic packet to a client device based on the determined forwarding rule comprises:

using a UDP name server to determine a corresponding ZTNA rule from the destination address; and sending the UDP packet to a ZTNA client having the address from the determined forwarding rule.

5. The method of claim 1, wherein the bi-directional tunnel comprises Quick User Datagram Protocol (UDP) Internet Connections (QUIC)-compliant tunnel.

6. The method of claim 1, wherein generating a request over a stream within the bi-directional tunnel to establish a connection with a proxy device comprises generating a GET request on the QUIC-compliant stream to establish a ZTNA tunnel to the proxy device.

7. The method of claim 1, wherein wrapping the payload further comprises encoding the stream identifier as a variable-length integer and prefixing the encoded stream identifier to the payload prior to forwarding.

8. The method of claim 1, further comprising shifting the stream identifier prior to wrapping to remove protocol-specific flag bits indicating bidirectionality and stream origin.

9. A non-transitory computer-readable storage medium having stored thereon instructions that, when executed by one or more processors, are configurable to cause one or more computing devices to:

determine a forwarding rule based on a destination address associated with a received data traffic packet formatted according to a first protocol, wherein the forwarding rule comprises a zero-trust network access (ZTNA)-compliant traffic forwarding rule and the first protocol comprises a User Datagram Protocol (UDP)-compliant protocol;

create a bi-directional tunnel to forward the traffic based on the determined forwarding rule;

generate a request over a stream having a corresponding stream identifier within the bi-directional tunnel to establish a connection with a proxy device;

wrap a payload of the traffic packet formatted according to the first protocol with at least the stream identifier;

forward the wrapped payload of the traffic packet to a client device based on the determined forwarding rule to a destination device corresponding to the stream identifier.

10. The non-transitory computer-readable storage medium of claim 9, wherein the corresponding stream identifier comprises QUIC stream ID corresponding with the QUIC stream that was used to establish the tunnel.

11. The non-transitory computer-readable storage medium of claim 10, wherein wrapping the traffic packet payload formatted according to the first protocol with at least the stream identifier comprises appending the QUIC stream ID to the UDP datagram payload being forwarded.

12. The non-transitory computer-readable storage medium of claim 9, wherein forwarding the data traffic packet to a client device based on the determined forwarding rule comprises:

using a UDP name server to determine a corresponding ZTNA rule from the destination address; and sending the UDP packet to a ZTNA client having the address from the determined forwarding rule.

13. The non-transitory computer-readable storage medium of claim 9, wherein the bi-directional tunnel comprises Quick User Datagram Protocol (UDP) Internet Connections (QUIC)-compliant tunnel.

14. The non-transitory computer-readable storage medium of claim 9, wherein generating a request over a stream within the bi-directional tunnel to establish a connection with a proxy device comprises generating a GET request on the QUIC-compliant stream to establish a ZTNA tunnel to the proxy device.

15. The non-transitory computer-readable storage medium of claim 9, wherein the instructions further cause the computing device to associate received datagrams with a tunnel using the prefixed stream identifier without traversing a QUIC stream.

16. The non-transitory computer-readable storage medium of claim 9, wherein the instructions further cause the computing device to close the bidirectional tunnel in response to detecting closure of a local UDP socket associated with an originating application.

17. A system comprising:

a memory system;

a hardware processor coupled with the memory system, the hardware processor configurable to:

determine a forwarding rule based on a destination address associated with a received data traffic packet formatted according to a first protocol, wherein the forwarding rule comprises a zero-trust network access (ZTNA)-compliant traffic forwarding rule and the first protocol comprises a User Datagram Protocol (UDP)-compliant protocol, create a bi-directional tunnel to forward the traffic based on the determined forwarding rule, generate a request over a stream having a corresponding stream identifier within the bi-directional tunnel to establish a connection with a proxy device, wrap a payload of the traffic packet formatted according to the first protocol with at least the stream identifier, and forward the wrapped payload of the traffic packet to a client device based on the determined forwarding rule to a destination device corresponding to the stream identifier.

18. The system of claim 17, wherein wrapping the traffic packet payload formatted according to the first protocol with at least the stream identifier comprises appending the QUIC stream ID to the UDP datagram payload being forwarded.

19. The system of claim 17, wherein the bi-directional tunnel comprises Quick User Datagram Protocol (UDP) Internet Connections (QUIC)-compliant tunnel.

20. The system of claim 17, wherein the hardware processor is further configurable to maintain a pool of active tunnels and remove a tunnel from the pool after expiration of a timeout following closure of all associated streams.

\* \* \* \* \*